United States Patent
Ryoo et al.

(12) 
(10) Patent No.: US 6,345,031 B1
(45) Date of Patent: Feb. 5, 2002

(54) OBJECT-LENS DRIVING DEVICE FOR OPTICAL PICKUP INCLUDING A PLURALITY OF SUPPORTING PLATE SPRING MEMBERS

(75) Inventors: Byung-ryul Ryoo, Suwon; Dae-hwan Kim, Seoul, both of (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 776 days.

(21) Appl. No.: 08/661,733

(22) Filed: Jun. 11, 1996

(30) Foreign Application Priority Data

Nov. 30, 1995 (KR) .............................................. 95-45833

(51) Int. Cl.⁷ ................................................. G11B 7/09
(52) U.S. Cl. ..................................................... 369/247
(58) Field of Search .............................. 369/249, 44.15, 369/44.11

(56) References Cited

U.S. PATENT DOCUMENTS

| | | | | |
|---|---|---|---|---|
| 4,613,202 A | * | 9/1986 | Kuriyama | ................. 369/44.15 |
| 4,783,476 A | * | 11/1988 | Sekimoto et al. | ........ 369/44.15 |
| 4,927,235 A | * | 5/1990 | Narumi | .................... 369/44.15 |
| 5,579,176 A | * | 11/1996 | Ikegame et al. | ......... 369/44.15 |

FOREIGN PATENT DOCUMENTS

| | | | | |
|---|---|---|---|---|
| JP | 59-124043 | * | 7/1984 | .............. 369/44.15 |
| JP | 60-29945 | * | 2/1985 | .............. 369/44.15 |
| JP | 61-258346 | * | 11/1986 | .............. 369/44.15 |
| JP | 63-224039 | * | 9/1988 | .............. 369/44.15 |
| JP | 2-232824 | * | 9/1990 | .............. 369/44.15 |
| JP | 5-114151 | * | 5/1993 | .............. 369/44.15 |

* cited by examiner

Primary Examiner—Brian E. Miller
(74) Attorney, Agent, or Firm—Sughrue Mion, PLLC

(57) ABSTRACT

An object-lens driving device for an optical pickup and which employs such a fine pattern coil as is used in a compact disk player or a laser disk player. The object-lens driving device for an optical pickup eliminates the rolling phenomenon caused when a wire having a circular cross-section is used as a supporting member. Focusing and tracking are controlled more stably, since a plurality of plate springs is used for elastically biasing the horizontal or vertical movement of a driving portion body.

3 Claims, 6 Drawing Sheets

OBJECT-LENS DRIVING DEVICE FOR OPTICAL PICKUP INCLUDING A PLURALITY OF SUPPORTING PLATE SPRING MEMBERS

BACKGROUND OF THE INVENTION

The present invention relates to an object-lens driving device for an optical pickup installed in an optical recording and/or reproducing apparatus and, more particularly, to a device for supporting an object-lens driving portion, which elastically supports the object-lens driving portion according to vertical and/or horizontal displacement of the object-lens driving portion.

In a recording/reproducing apparatus employing an optical recording medium (hereinafter referred to as a disk) such as a laser disk player or compact disk player, an optical pickup having an object lens is provided for projecting a light beam (laser beam) onto the surface of the disk and detecting the reflected beam therefrom in order to read recorded digital data as a binary signal. In the operation of the optical pickup, the distance between the object lens and the disk must be kept constant to maintain correct focusing, and precise tracking of the projected light beam is required to reproduce the data on the disk without noise. Working against this, however, is the eccentricity error of the center hole of any manufactured optical disk, which is unavoidable. Once the disk is placed on a turntable, such eccentricity errors create unwanted oscillations in operation which cause reproduction errors. As a result, the distance between the optical disk and the object lens for the optical pickup cannot be kept constant and tracking on the disk is unstable. Therefore, to compensate for reproduction errors and achieve the correct focusing and tracking, a driving portion for slightly moving the object-lens - vertically and/or horizontally—and some form of elastic support for supporting the driving portion are needed. Conventionally, a plurality of wires have been used as elastic supporting means in order to support the body of the driving portion having an object lens installed therein.

FIG. 1 illustrates a conventional optical pickup driving device employing wires as elastic supporting means.

As shown in FIG. 1, a fine pattern coil 4 is connected to a driving portion body 6 having an object lens 2 thereon. A plurality of wires 3 are provided, one end of each wire being connected to the fine pattern coil 4 and the other end thereof being inserted into a hole formed through a holder 1. The wires 3 serve to support the driving portion body 6.

In the above optical pickup driving device, when a drive current is applied through a power supply unit 7, the current flows to the fine pattern coil 4 via the wires 3. The current flowing through the fine pattern coil 4 and the magnetic force of a pair of magnets 5 and 5' positioned orthogonal to the current direction of the fine pattern coil 4 generate an electromagnetic force in accordance with Fleming's left-hand rule:

$$F=BIl \sin(B_m \perp I_m)$$

where F is electromagnetic force, $B_m \perp I_m$ is the angle between the magnetic force direction and the current direction, B is magnetic force, I is applied current, and l is the length of a conducting wire. Thus, the driving portion body 6 slightly moves depending on the direction of the electromagnetic force, with the wires 3 elastically biasing and supporting the driving portion body 6.

However, use of the wires 3 as a supporting member, which have a circular cross-section, is likely to result in a rolling phenomenon, since each inserted wire 3 makes contact with the holder 1, i.e., the inside of the hole 1a only, over a small surface area, and a gap exists between the hole 1a and the outer circumferential surface of the inserted wire 3. The rolling phenomenon is where the focus of the object lens 2 appears to rotate, not being constantly converged onto the disk (not shown) during the movement of the driving portion body 6 while being controlled for focusing and tracking, which is also the cause of reproduction errors.

SUMMARY OF THE INVENTION

The present invention is intended to overcome the above problems. An object of the present invention is to provide an object-lens driving device for increasing an area in which an elastic supporting member contacts a holder by using an elastic supporting plate member, so as to eliminate the rolling phenomenon.

To achieve the above object of the present invention, there is provided an object-lens driving device for an optical pickup, comprising a driving portion body having an object lens mounted thereon, an electromagnetic circuit attached to the driving portion body, including a fine pattern coil having a tracking coil and a focusing coil formed on a common plane, a supporting mechanism which supports the driving portion body, and a holder for mounting the supporting mechanism, wherein the supporting mechanism has a plurality of plate spring members, one end portion of each of said plate spring members being mounted to the holder, and an opposite end portion of each of said plate spring members being fixed to the driving portion body, for being elastically deformed either vertically or horizontally.

Many variations can be made according to the mechanism of combining the holder with the plate spring members: a plurality of vertical protrusions is extended from the holder, and a combining hole or groove is formed in each of the plate spring members, for receiving a corresponding one of the protrusions; alternatively, insertion holes are formed through the holder, for receiving the plate spring members, gaps between the holes and the plate spring members being filled with damping members. Each of the plate spring members may include a damping member for suppressing oscillations attached to one side thereof.

BRIEF DESCRIPTION OF THE DRAWINGS

The above object and advantages of the present invention will become more apparent by describing in detail a preferred embodiment thereof with reference to the accompanying drawings, in which.

DETAILED DESCRIPTION OF THE INVENTION

Figure 2:
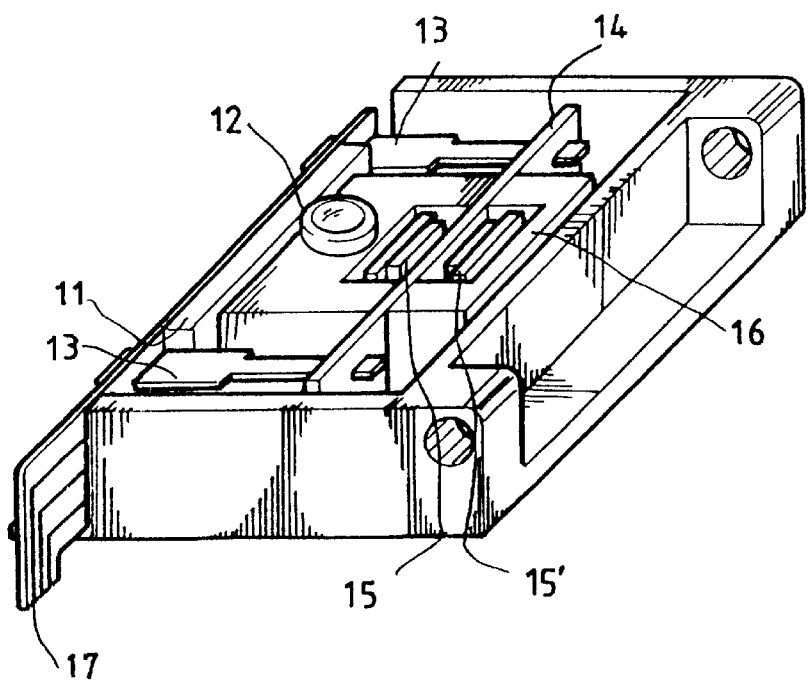
FIG. 2 is a perspective view of an object-lens driving device employing plates as a supporting member, according to the present invention.

FIG. 2 illustrates an object-lens driving device according to the present invention.

As shown in FIG. 2, an object lens 12 is mounted on a driving portion body 16. The driving portion body 16 is also provided with components generally used in an electromagnetic circuit, including opposing permanent magnets 15 and 15', and a fine pattern coil 14 positioned between the permanent magnets 15 and 15' for generating electromagnetic force by interaction with the permanent magnets 15 and 15' according to an applied current.

According to a characteristic of the present invention, a plurality of plate springs 13 are further provided, one end of each of the plate springs 13 being fixed to a holder 11 and a power supply unit 17 and the other end thereof being fixed to the fine pattern coil 14, to elastically support the driving portion body 16 with respect to the horizontal and vertical movement thereof. A flexible printed circuit board is used as the power supply unit 17.

Now, the operation of the object-lens driving device according to the present invention will be described.

Figure 1:
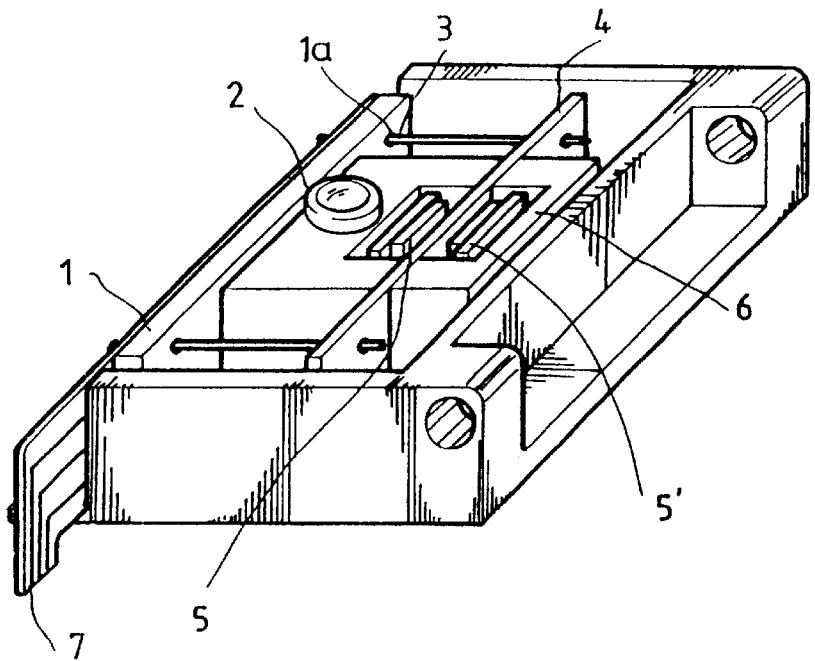
FIG. 1 is a perspective view of a conventional object-lens driving device employing wires as a supporting member.

First, current for an error correction signal is applied from the power supply unit 17 to the fine pattern coil 14 through the plate springs 13 which also serve as conducting wires, thus forming a current circuit. The current flow generates electromagnetic force according to Fleming's left-hand rule, through interaction with the magnetic field of the permanent magnets 15 and 15'. Thus, the driving portion body 16 is displaced vertically or horizontally. At the same time, the plate springs 13 support the driving portion body 16 to elastically bias its displacement. In the present invention, the plate springs 13 contact the holder 11 over a large area and a gap therebetween is smaller than that when the wires (see FIG. 1) are employed.

The plate springs 13 can be variously modified to be fixed to the holder 11.

FIGS. 3 through 6 illustrate various embodiments of combining plate springs with a holder, in the object-lens driving device according to the present invention.

Figure 3:
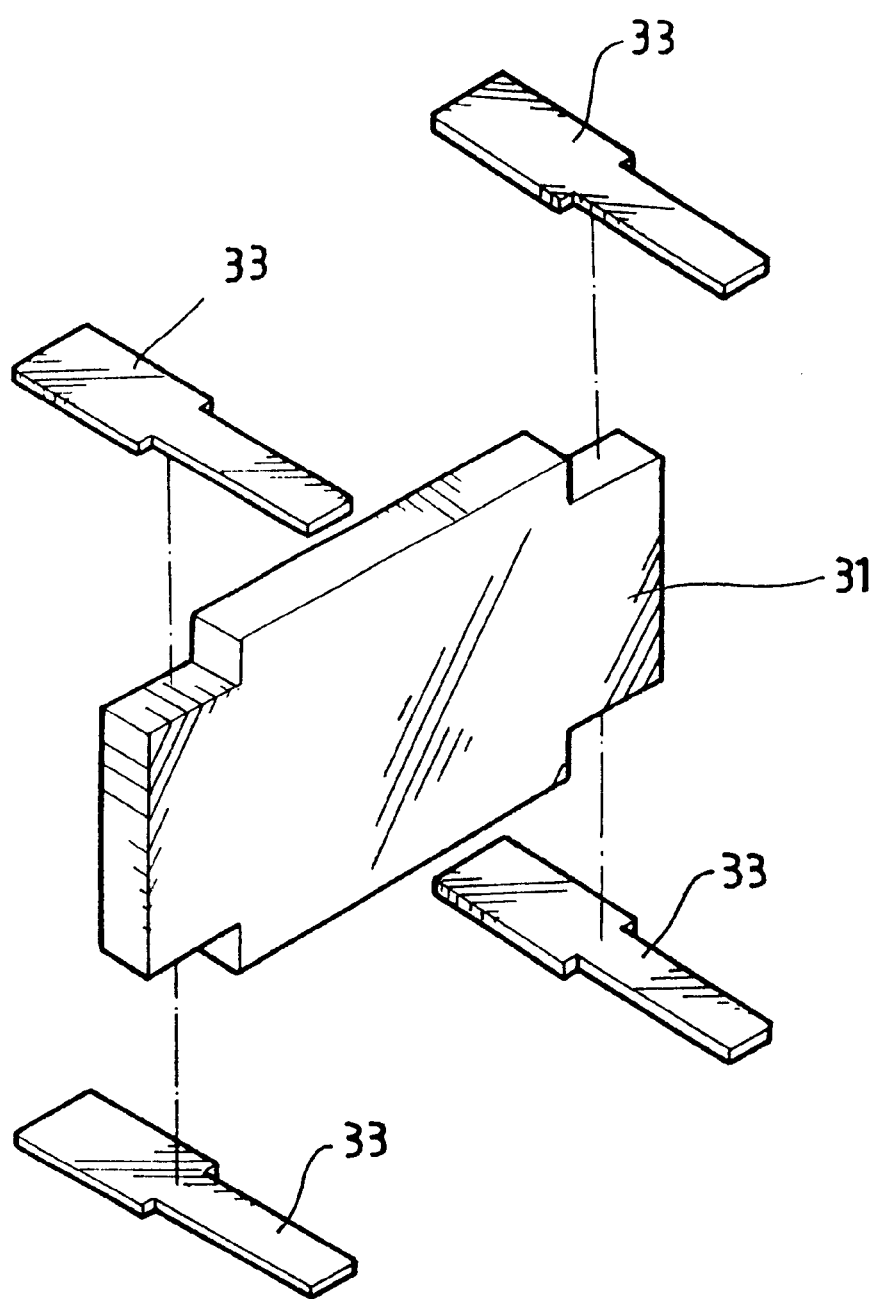
FIG. 3 is an extracted perspective view for showing a first embodiment of combining the plates with a holder in FIG. 2.

As shown in FIG. 3, plate springs 33 may be attached, for example, by an adhesive onto a holder 31, as a way to connect the plate springs 33 to the holder 31.

Figure 4:
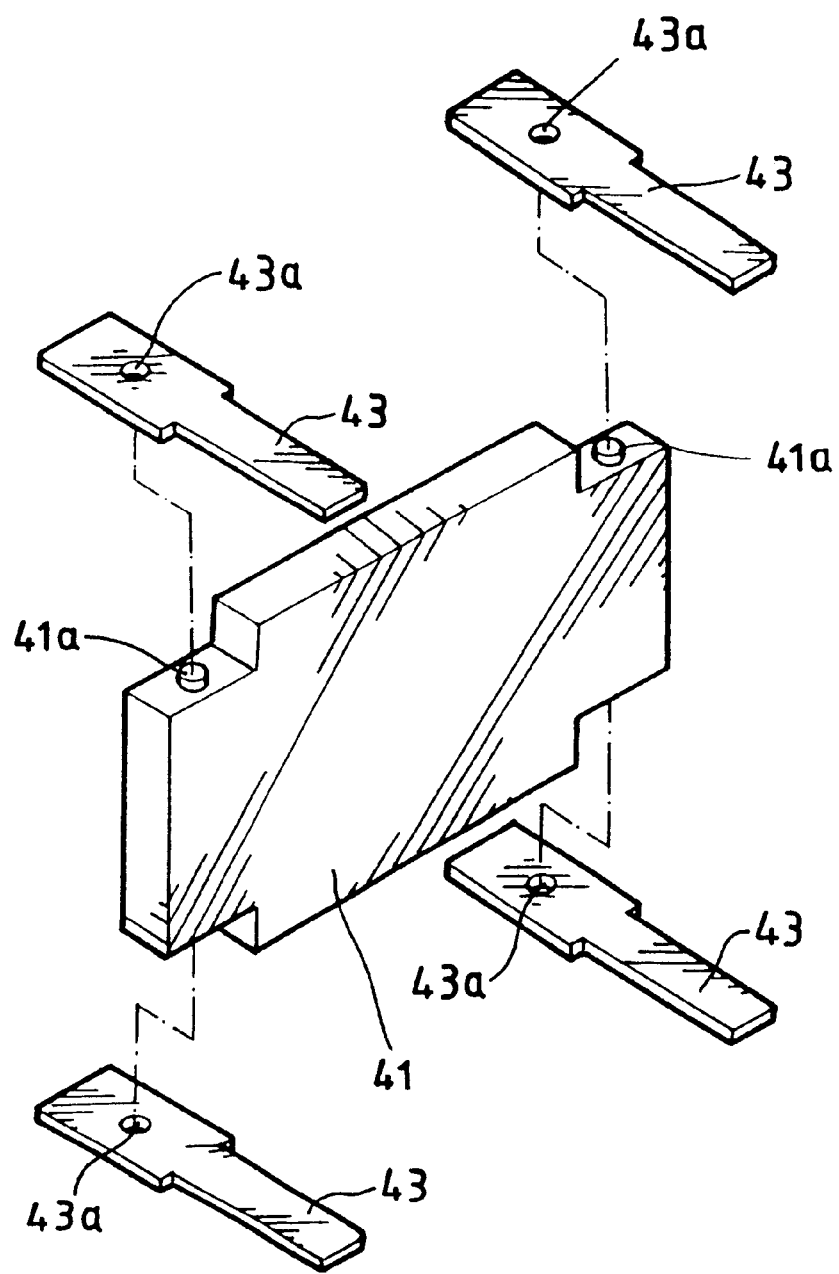
FIG. 4 is an extracted perspective view for showing a second embodiment of combining the plates with a holder in FIG. 2.

As shown in FIG. 4, cylindrical protrusions 41a are provided on a surface of a holder 41, and combining holes 43a for insertion of the protrusions 41a thereinto are formed in plate springs 43, thus combining the plate springs 43 with the holder 41.

Figure 5:
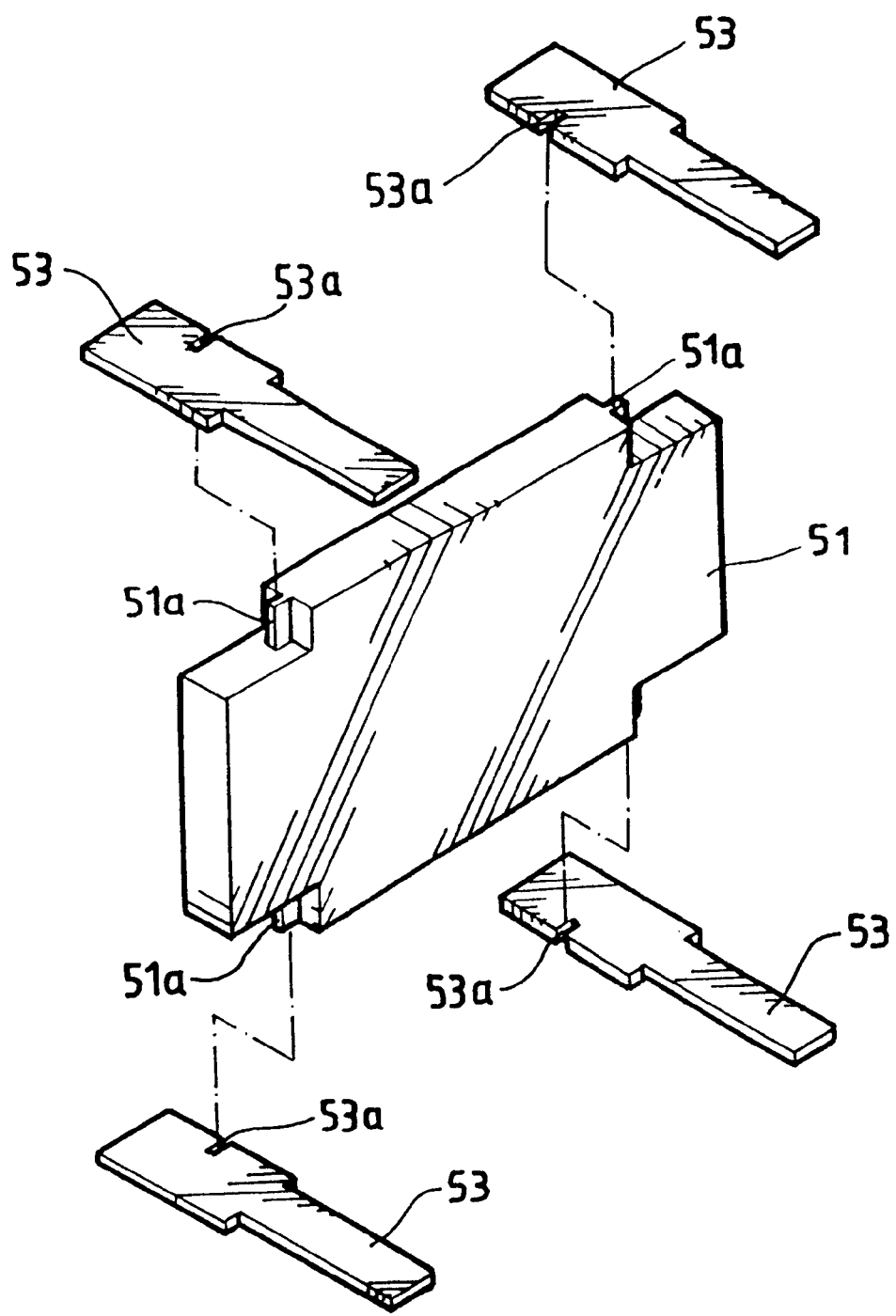
FIG. 5 is an extracted perspective view for showing a third embodiment of combining the plates with a holder in FIG. 2.

As shown in FIG. 5, planar protrusions 51a laterally extending from a holder 51 are provided, and grooves 53a for receiving the protrusions 51a are formed in edges of plate springs 53, thus combining the plate springs with the holder.

Figure 6A:
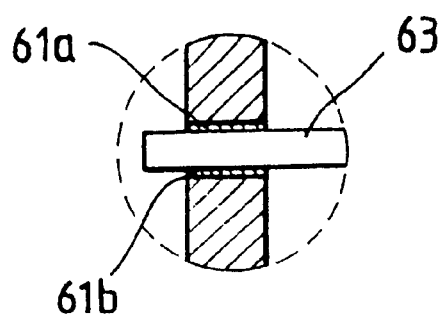
FIG. 6 is an extracted perspective view and FIG. 6A an enlarged view for showing a fourth embodiment of combining the plates with a holder in FIG. 2.
Figure 6:
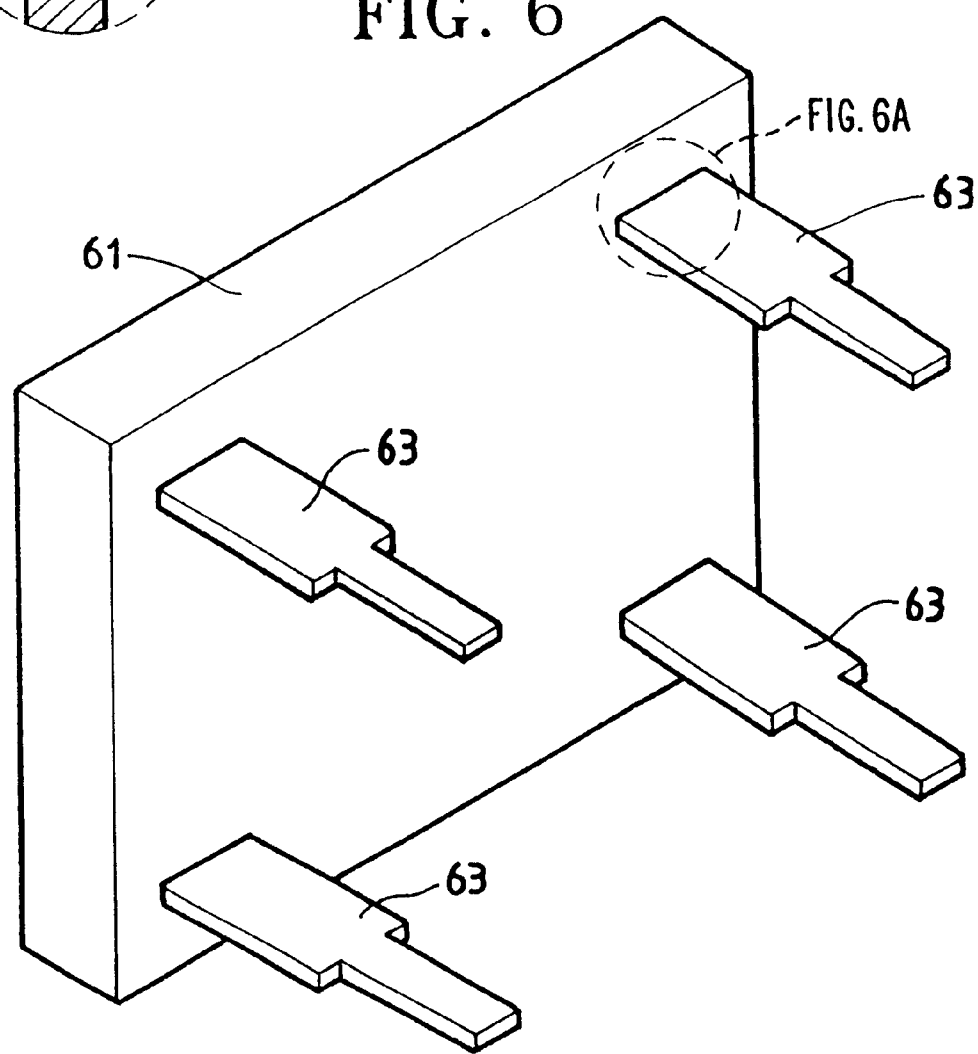

As shown in FIG. 6, insertion holes 61a for receiving plate springs 63 are formed through a holder 61. Thus, the plate springs 63 are inserted into the insertion holes 61a, and then the gaps between the plate springs 63 and the holder 61 are filled with damping members 61b.

Figure 7:
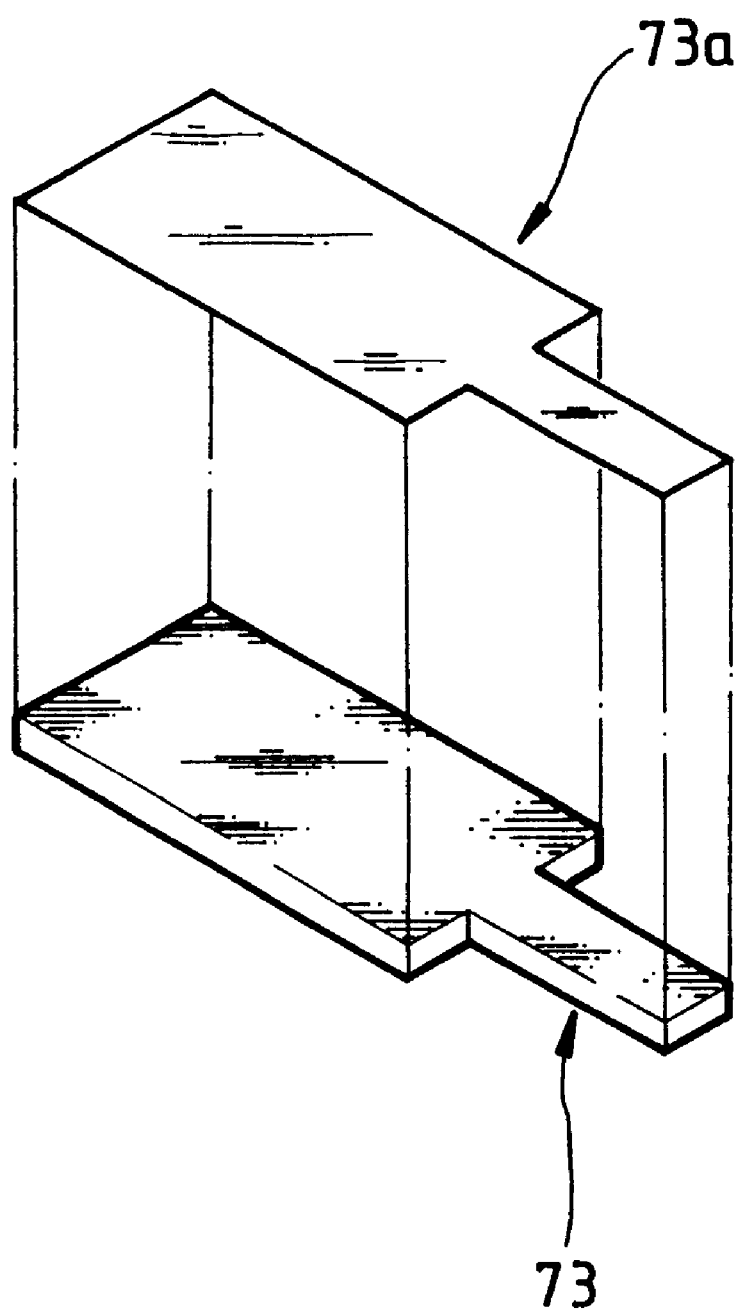
FIG. 7 is an extracted perspective view for showing a damping member for the plate spring.

Further, in each of the embodiments, the damping force can be reinforced by attaching an adhesive tape 73a onto the side of each of the plate springs 73 as a damping member for suppressing oscillations (see FIG. 7).

In the object-lens driving device according to the present invention, since a plate spring contacts a holder over a large area and a small gap exists between them as compared to the case where a wire is employed, the rolling phenomenon, to which the wire is vulnerable when supporting the driving portion body, is eliminated. Consequently, focusing and tracking can be stably controlled.

Though the present invention is described referring to the above embodiment shown in the attached drawings, the embodiment is an exemplary application. Therefore, it is clearly understood that many variations are possible within the spirit and scope of the present invention by those who have ordinary skill in the art.

What is claimed is:

1. An object-lens driving device for an optical pickup, comprising: a driving portion body having an object lens mounted thereon; an electromagnetic circuit attached to said driving portion body, including a fine pattern coil having a tracking coil and a focusing coil formed on a common plane; a supporting mechanism which supports said driving portion body: and a holder for mounting said supporting mechanism;

wherein said supporting mechanism includes a plurality of plate spring members, one end portion of each of said plate spring members being mounted to said holder, and an opposite end portion of each of said plate spring members being fixed to said driving portion body, for being elastically deformed either vertically or horizontally, and further wherein said holder includes a plurality of protrusions which protrude horizontally from said holder, and wherein an edge of each of said plate spring members includes a groove for receiving a corresponding one of said protrusions.

2. The object-lens driving device for an optical pickup as claimed in claim 1, wherein each of said plate spring members has a damping member for suppressing oscillations, which is attached onto a side thereof.

3. The object-lens driving device for an optical pickup as claimed in claim 2, wherein said damping member is an adhesive tape.

* * * * *